(12) United States Patent
Ward (10) Patent No.: US 9,705,727 B2
(45) Date of Patent: Jul. 11, 2017

(54) REMOTE VIEWING OF MEDIA CONTENT USING LAYERED VIDEO ENCODING

(71) Applicant: Echostar UK Holdings Limited, Keighley Yorkshire (GB)

(72) Inventor: Martyn Ross Ward, West Yorkshire (GB)

(73) Assignee: EchoStar Technologies L.L.C., Englewood, CO (US)

( * ) Notice: Subject to any disclaimer, the term of this patent is extended or adjusted under 35 U.S.C. 154(b) by 166 days.

(21) Appl. No.: 13/750,792

(22) Filed: Jan. 25, 2013

(65) Prior Publication Data

US 2013/0198403 A1 Aug. 1, 2013

(30) Foreign Application Priority Data

Feb. 1, 2012 (EP) .................................. 12153424

(51) Int. Cl.
*H04L 29/06* (2006.01)
*H04N 21/2343* (2011.01)
*H04N 21/258* (2011.01)

(52) U.S. Cl.
CPC ........ *H04L 29/06476* (2013.01); *H04L 65/60* (2013.01); *H04N 21/234327* (2013.01); *H04N 21/25833* (2013.01); *H04N 21/25891* (2013.01)

(58) Field of Classification Search
CPC ............................................... H04L 29/06476
USPC ......................................................... 709/231
See application file for complete search history.

(56) References Cited

U.S. PATENT DOCUMENTS

| 6,496,980 | B1 * | 12/2002 | Tillman et al. ................. 725/90 |
| 7,861,272 | B2 * | 12/2010 | Russ et al. ...................... 725/74 |
| 2002/0116473 | A1 * | 8/2002 | Gemmell ....................... 709/219 |
| 2006/0023748 | A1 * | 2/2006 | Chandhok et al. ........... 370/469 |
| 2007/0025438 | A1 | 2/2007 | Bruls |

(Continued)

FOREIGN PATENT DOCUMENTS

| GB | 1579123 A | 11/1980 |
| WO | 2004036868 A1 | 4/2004 |

OTHER PUBLICATIONS

European Patent Office "Extended Search Report" dated Jul. 19, 2012 for European Patent Appln. No. 12153424.2.

(Continued)

*Primary Examiner* — Nicholas Taylor
*Assistant Examiner* — Sanjoy Roy
(74) *Attorney, Agent, or Firm* — LK Global (57) ABSTRACT

Systems, devices and processes are described to transfer a media program from a media server to a playback device over a network. The media program is encoded in a multi-layer format having a plurality of layers comprising a base layer and at least one additional layer. The base layer supports playback of the entire media program at a lower resolution and each of the additional layers provides additional data that, when combined with the base layer, supports playback of the media program at a higher resolution. The base layer is initially transferred to allow playback of the media program at the lower resolution on the playback device. If sufficient resources remain after transfer of the base layer, then at least one of the additional layers may be subsequently transferred to allow playback of the media program at the higher resolution.

11 Claims, 4 Drawing Sheets

(56) References Cited

U.S. PATENT DOCUMENTS

| | | | |
|---|---|---|---|
| 2007/0157253 A1* | 7/2007 | Ellis | H04N 5/44543 |
| | | | 725/61 |
| 2008/0209066 A1* | 8/2008 | Spio | H04L 65/60 |
| | | | 709/231 |
| 2009/0030976 A1* | 1/2009 | Shukla | H04L 65/4015 |
| | | | 709/203 |
| 2009/0252217 A1* | 10/2009 | Wittig | 375/240.01 |
| 2011/0286526 A1* | 11/2011 | Nakagami et al. | 375/240.16 |
| 2012/0176858 A1 | 7/2012 | Stenzel et al. | |

OTHER PUBLICATIONS

Canadian Office Action, Canadian Patent Application No. 2802264, issued Mar. 29, 2016.
Mexico Patent Office, Mexican Patent Application No. MX/a/2013/001315, Issued Apr. 29, 2016.

* cited by examiner

REMOTE VIEWING OF MEDIA CONTENT USING LAYERED VIDEO ENCODING

CROSS-REFERENCES TO RELATED APPLICATIONS

This Application claims priority to European Application Serial No. 12153424.2, filed Feb. 1, 2012.

TECHNICAL FIELD

The following discussion generally relates to systems and techniques for processing media content such as television programming. More particularly, the following discussion relates to systems and methods to allow remote viewing of television content and/or other media content using layered video encoding.

BACKGROUND

Television viewing is no longer limited to the viewer's home. With the advent of mobile devices such as smart phones, portable media players, portable computers, tablet computers and the like, it is now possible to enjoy television programming and other multimedia content while traveling or commuting, or from virtually any location at home or away.

There are currently various ways to deliver media content to mobile devices. In some cases, the viewer's desired content may be obtainable directly from the source in a continuously streaming format via the Internet or another network. Many television networks, for example, now allow direct access to at least some streaming programming via websites such as Hulu.com, HBO.com, or the like. Even if the desired content is not available from the source, various placeshifting solutions are now available that can allow viewers to stream desired content from personal television receivers, media players or digital video recorders to mobile phones or other devices. The various placeshifting products available from Sling Media Inc. of Foster City, Calif., for example, allow television content to be shifted in a streaming format from a remotely-located set top box or digital video recorder to a mobile phone, portable computer or other playback device via the Internet or another network. Other types of content delivery may also be available via direct broadcast satellite (DBS) or other sources.

While streaming is convenient for many purposes, it does have various shortcomings. In particular, since the media stream is typically provided continuously during playback, streaming media typically demands a live connection to the host throughout all (or at least a substantial portion) of the playback. This can be a significant challenge during airline flights or other situations in which active streaming connections are not readily available, or are unreliable.

Even when online streaming is unavailable, various offline playback techniques may be attempted. Offline playback is typically supported by synchronizing a copy of a media file from a server to the playback device prior to playback. Usually, the desired program can be played back from a locally-stored copy after the media file has been transferred. While this scenario eliminates the need for a live connection during playback, the synchronizing file transfer process can present its own challenges. In particular, if the data connection between the server and the playback device should become unavailable for any reason during file synchronization, then the partial file maintained by the playback device may be unusable. At the very least, the partial file may be missing at least a portion of the programming content, thereby potentially causing the viewer miss the end of the program.

It is therefore desirable to create systems and processes to allow efficient and reliable viewing of media programs on remotely-located playback devices. These and other desirable features and characteristics will become apparent from the subsequent detailed description and the appended claims, taken in conjunction with the accompanying drawings and this background section.

BRIEF SUMMARY

According to various exemplary embodiments, systems, devices and methods are described to placeshift video streams using layered video encoding. More particularly, various systems, devices and processes are described to transfer media programs from a media server to a playback device over a network. The media program is suitably encoded in a multi-layer format having a plurality of layers comprising a base layer and at least one additional layer. The base layer appropriately supports playback of the entire media program at a lower resolution and each of the additional layers provides additional data that, when combined with the base layer, supports playback of the media program at a higher resolution. The base layer is initially transferred to allow playback of the media program at the lower resolution on the playback device. If sufficient resources remain after transfer of the base layer, then at least one of the additional layers may be subsequently transferred to allow playback of the media program at the higher resolution.

A corresponding computer program for implementing the methods described herein on an appropriate system or device as described herein may also be provided.

Additional embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, multi-layer encoding techniques are used to allow prioritization of media content that is synchronized from a media server to a remotely-located playback device. Typically, a base layer encodes the entire media program at a relatively low resolution, with one or more additional layers providing additional resolution. By transferring the base layer in advance of the additional layers, a lower bandwidth version of a program can be provided to the playback device relatively quickly to allow immediate playback. Layers that provide additional resolution can be sent after the base layer, thereby allowing for improved resolution if conditions warrant. By providing a complete (albeit lower resolution) copy of the media program at the outset, the probability of the viewer missing the end of a program due to connection or storage issues is substantially diminished.

In some implementations, the lower-resolution layer can also support "fast start" of playback during synchronization. By providing a lower-resolution copy of at least the first portion of a media program at the outset of synchronization, the receiving playback device will more quickly receive enough data to start playing the program, thereby allowing for reduced latency and an improved user experience.

Still further embodiments may allow prioritization of different layers for different programs such that multiple programs are initially transferred at lower resolution, with the additional data layers that provide improved resolution being transferred only after the base layers of all programs have been successfully received. The various layers of different programs can be prioritized based upon user preferences or other factors as desired so that higher priority content layers are transferred before lower priority content layers. Other modifications or enhancements may be provided as desired.

Figure 1:
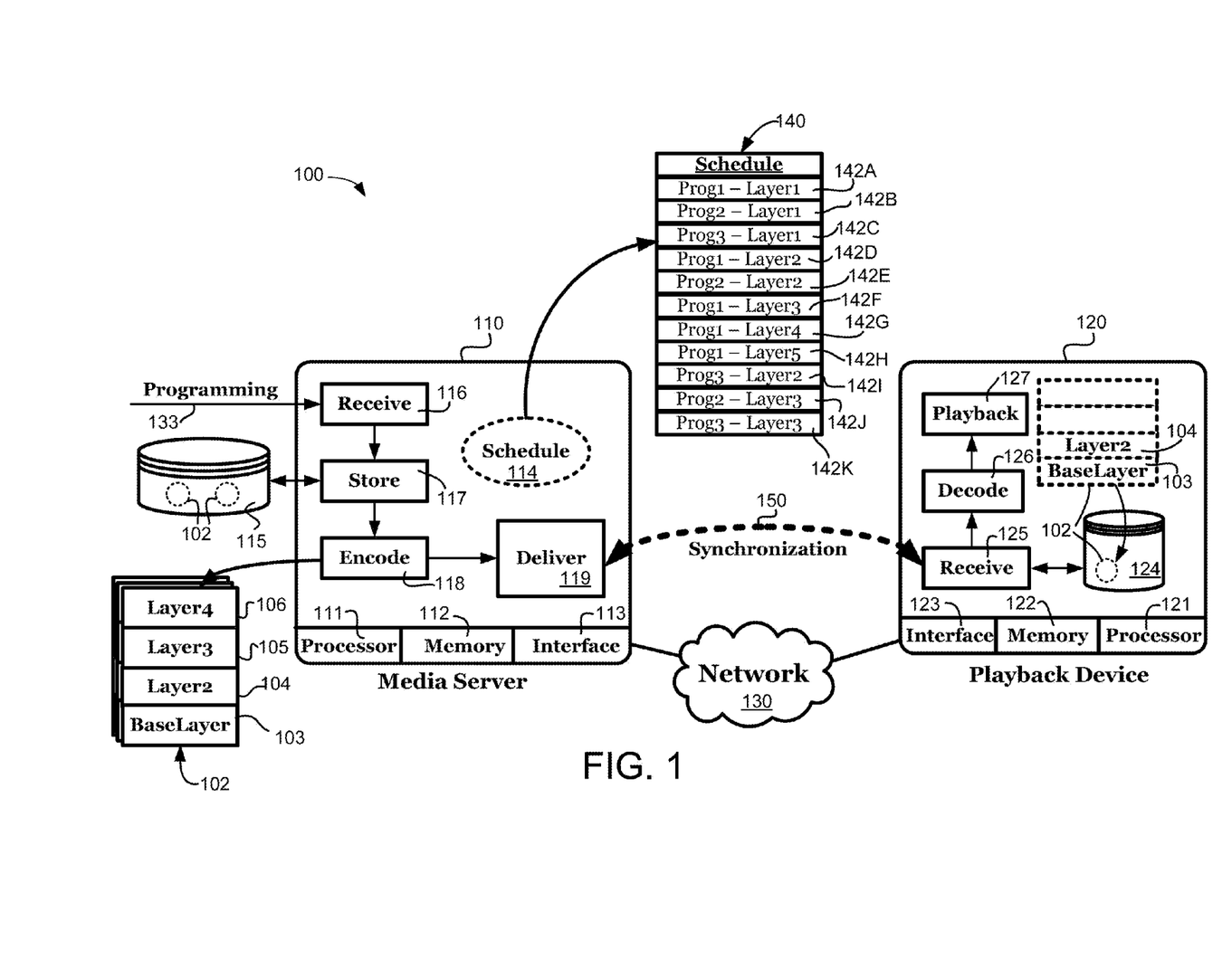
FIG. 1 is a block diagram showing an exemplary media encoder and an exemplary playback device.

Turning now to the drawing figures and with initial reference to FIG. 1, an exemplary system 100 for transferring media programs suitably includes media server device 110 that communicates with one or more playback devices 120 via a network 130. In the illustrated embodiment, media server 110 suitably includes appropriate hardware and/or software to receive and store media programs 102, and to encode the received media programs in a multi-layer format that includes a base layer 103 and one or more additional layers 104, 105, 106. Media programs 102 that are stored on media server 110 are delivered to playback device(s) 120 according to an appropriate schedule 140 during a synchronization session 150 to thereby allow the playback device 120 to store and playback the received media content as desired. As briefly mentioned above, the multi-layer format allows for a more robust file transfer of the synchronized media programs 102, and may also provide for faster playback.

Media server 110 is any media component or other device capable of receiving media programs from a broadcast, streaming, stored media or other content source and of encoding the received programs in the multi-layer format for delivery to one or more remote playback devices 120 as desired. In various embodiments, media server 110 is implemented within an otherwise-conventional set top box (STB) or similar television receiver, media player, digital video recorder (DVR), personal video recorder (PVR) or the like. Such embodiments may be associated with a particular user or customer, as appropriate, and may be located at customer premises or other locations as desired. Equivalent embodiments may be implemented using a conventional network server system, such as a hardware or "cloud" based server operating on the Internet or another network. Network-based media servers 110 may be used, for example, to store and transfer media programs 102 to a multitude of playback devices 120 associated with any number of customers or other users.

In the embodiment illustrated in FIG. 1, media server 110 operates using any sort of conventional computing hardware, such as a microprocessor 111, memory 112, and input/output interfaces 113. Interfaces 113 may include conventional network interface hardware that allows communications with network 130. In some implementations, media server 110 may include dedicated hardware (e.g., specialized integrated circuits) for receiving media programs, storing media programs, encoding media programs, delivering media programs, and/or the like. Other embodiments may implement the various functions performed by media server 110 using software residing in memory 112 or the like and executed by processor 111, as appropriate. Still other embodiments may be implemented using cloud hosting or other virtualization techniques, as desired.

In operation, media server 110 suitably receives, stores, encodes and delivers media programs 102. Programs 102 may be initially received from any broadcast, point-to-point, stored media, or other source 133. Examples of programming sources may include direct broadcast satellite (DBS) programming; cable television programming; terrestrial broadcast programming; streaming media obtained via the Internet or another network 130; programming downloaded from a media sharing service; programming received from a DVD, BLUE-RAY disk, or other stored media; and/or any other sources 133 as desired. Media programs 102 are initially received at a suitable receiver module 116, which may be implemented as a television receiver/decoder or the like depending on the type of media received. Received and decoded programs 102 are stored on an appropriate storage medium 115, such as a hard disk or memory. In various embodiments, storage medium 115 is a disk drive or solid state memory that is associated with a DVR function of media server 110, although other embodiments may use other storage as desired. Storage module 117, then, may be implemented using any conventional disk controller hardware or equivalent software executing on processor 111 or the like. Programs 102 are stored in storage device 115 at least until they are synchronized with playback device 120.

Prior to delivery via network 130, media server 110 appropriately encodes the received media program(s) 102 to a suitable multi-layer format. This encoding may take place either prior to or after storage on device 115 as desired. That is, media server 110 may convert the program 102 prior to storage (or concurrently with storage) in some implementations. Other implementations may store the received program in compressed or other format and then perform the multi-layer encoding just prior to synchronization 150, or at any other appropriate time. The multi-layer encoding may be performed using any sort of encoding module 118 that may be implemented using dedicated processing circuitry, or equivalently in software executing on processor 111 or the like.

Different embodiments may use any types of multi-layer encoding techniques. Multi-layered video encoding generally allows the entire program 102 to be encoded at a relatively low resolution within a first "base" layer 103, with additional resolution encoded into any number of additional layers 104-106. Each of the additional layers 104-106 provides data that combined with the data from lower layers 103-106 for improved resolution. "Resolution" in this sense may refer to spatial resolution (e.g., screen size), temporal resolution (e.g., frame rate), video quality (e.g., bitrate) and/or any other parameters as appropriate. An example of a video encoding technique that may be used in some embodiments is the scalable video coding (SVC) technique described in the Annex G extension of the H.264/MPEG-4 AVC video compression standard; equivalent embodiments may use other coding techniques as desired.

The different layers 103-106 of one or more programs 102 can be delivered over network 130 to one or more playback devices 120 using any sort of schedule 140. In many embodiments, a scheduling module 114 creates a schedule 140 for delivering the various layers 142A-K based upon user preferences or other factors as desired. A media delivery module 119 then implements the schedule 140 to transfer the various layers 142A-K of programs 102 to the playback device(s) 120, as described more fully below. Scheduling module 114 and media delivery module 119 may each be implemented using software programs, daemons, processes or the like executed by processor 111 in some embodiments. Equivalent embodiments may implement scheduling module 114 and/or media delivery module 119 using specialized hardware of any sort.

Schedule 140 provides any order for delivering the content contained in the various layers 142A-K of encoded programs 102. The particular order may be set based upon customer preferences or directives, as described more fully below. In the example shown in FIG. 1, the base layers 142A-C of three different programs ("Prog1", "Prog2" and "Prog3") are initially transferred so that the playback device is most likely to receive the complete programs (albeit in lower resolution) even if the synchronization session 150 is later disconnected. After the base layers are sent, then additional layers 142D-K of the various programs may be sent as resources allow. The example schedule 140 shown in FIG. 1 lists the second layers 142D-E of Prog1 and Prog2 being sent after the base layers 142A-C, followed by the third, fourth and fifth layers 142F-H of Prog1 and the remaining layers 142I-K of Prog2 and Prog3. This example shows that all of the base (lower resolution) content 142A-C for all three programs 102 can be initially transferred so that the complete content is available to the playback device 120 as quickly as possible, with the additional resolution layers 142D-K prioritized in any manner desired. Again, the various layers 142A-K may be prioritized to maximize the likelihood of successfully delivering viewable copies of multiple programs, to maximize likelihood of delivering increased resolution of particularly favored programs, and/ or for any other purpose as desired. Additional detail about various implementations is provided below.

Playback device 120 suitably receives the various layers 142A-K of programs 102 via network 130, stores the programs 102 as needed, and then decodes the programs for playback as desired. To that end, playback device 120 may be implemented as any sort of stationary or portable media player, mobile telephone, portable or stationary computer system, tablet computer, video game player and/or other device as desired. Such devices typically operate using conventional computing hardware such as a processor 121, memory 122 and interface 123 to network 130 and other input/output features as desired. The various functions of playback device 120 are frequently carried out by software instructions residing in memory 122 or elsewhere that can be executed by processor 121, as appropriate. Receive module 125, decode module 126 and/or playback module 127 may therefore be implemented as software routines executing on processor 121 in some embodiments; equivalent embodiments will implement one or more of modules 125-127 using dedicated integrated circuitry or other hardware. Playback device 120 may also include suitable storage such as a disk drive, solid state memory or other storage device 124 for storing programs 102 that are received from media server 110 or other sources prior to (or during) playback.

In operation, then, playback device 120 suitably receives programs 102 in the multi-layer format via the synchronization session 150 with media server 110. Received programs 102 are appropriately stored in storage 124 or elsewhere until playback on an integrated or external display, audio speakers and/or the like. Playback may take place under the control of a media player application or other playback module 127 as desired.

Figure 2:
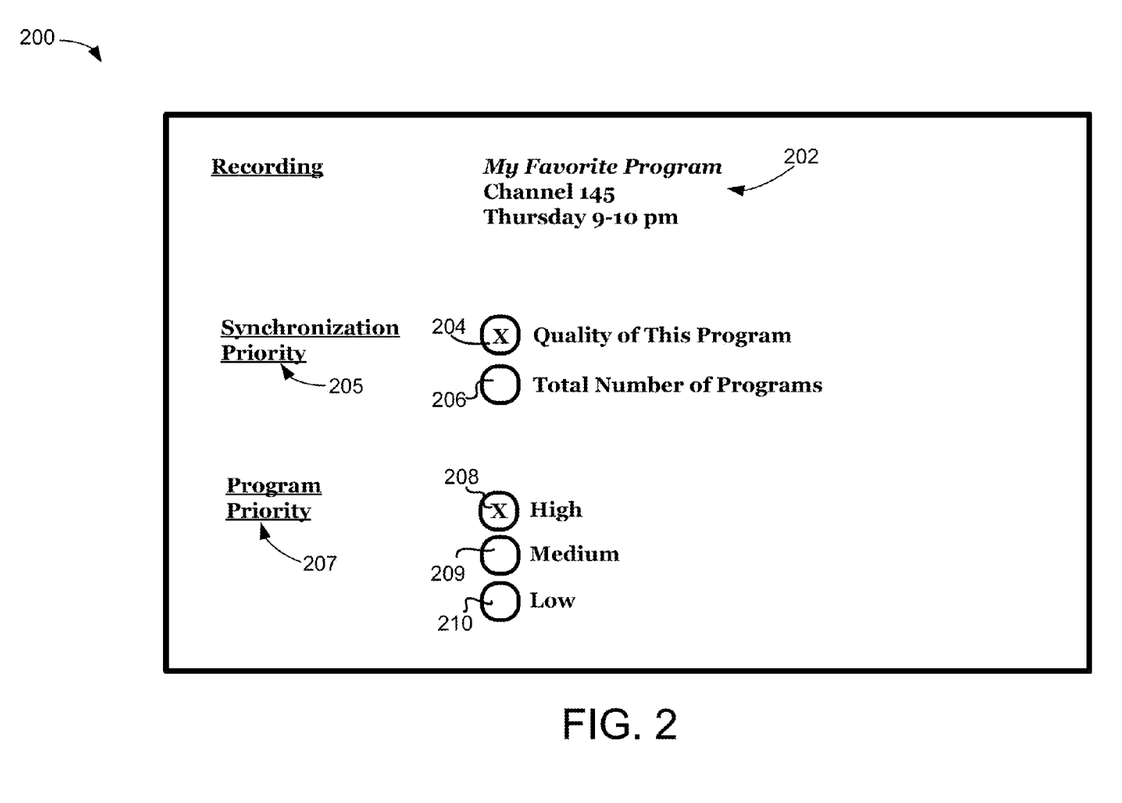
FIG. 2 is an exemplary user interface showing a user option to prioritize synchronization of files.

FIG. 2 shows an exemplary interface 200 for obtaining user preferences that can be used to set priorities in scheduling the synchronization schedule 140 described above. The example shown in FIG. 2 could be provided, for example, as part of a programming interface provided by a media server 110, playback device 120, a separate server on network 130 and/or any other device that processes user inputs regarding programs recorded at media server 110. Some implementations may provide the information shown in FIG. 2 as part of a record window associated with a DVR or PVR interface associated with a set top box, for example. Interface 200 may, in practice, therefore include electronic program guide data 202 or other information about the program 102 itself, as desired. The exemplary interface 200 shown in FIG. 2 should be considered as an illustrative example that could be modified and/or supplemented in any manner.

Generally speaking, interface 200 allows the viewer to provide information that allows scheduler module 114 to prioritize the various levels 142A-K of the different programs 102 that are to be transferred during synchronization session 150. To that end, an interface 200 suitably provides graphical or other interface features that allow the user to prioritize program quantity or quality, and to identify programs that are of greatest interest.

The example interface 200 shown in FIG. 2 allows the user to select the program priority 207 and the synchronization priority 205 for each program. More particularly, FIG. 2 shows two check boxes 204 and 206 for selecting the synchronization priority 205 to emphasize either the quality of the program or the quantity of programs, respectively, for synchronization 150. This could allow the user to prioritize higher layers of this program to be transferred before lower layers of other programs, for example. Other embodiments may equivalently set synchronization priority 205 as a more global preference such that a single setting affects multiple programs 102. That is, a single setting could prioritize quality or quantity of multiple programs 102, as desired. Further, synchronization priority 205 may be equivalently set using other interface features other than the checkboxes 204, 206 shown in FIG. 2. Examples of equivalent interface features used to select synchronization priority 205 could include sliders, dials, alphanumeric inputs, and/or the like.

Program priority 207 may also be selected in any manner. This setting allows the scheduler module 114 to prioritize between different programs such that higher priority programs 102 are synchronized before lower priority programs 102. The example illustrated in FIG. 2 allow the user to select from check boxes 208, 209, 210 corresponding to high, medium and low priority (respectively) for the particular program 102. Equivalent embodiments could use any number of priority levels or interface features to select priority levels, including any sort of slider, knob, alphanumeric value and/or the like.

Scheduler module 114 (FIG. 1) therefore creates synchronization schedule 140 based upon the synchronization priority 205 and/or any program priorities 207 that may be set by the user. As noted above, the user is able to prioritize program quality or quantity for first transfer, and to select those programs 102 that are of greatest interest as appropriate.

Figure 3:
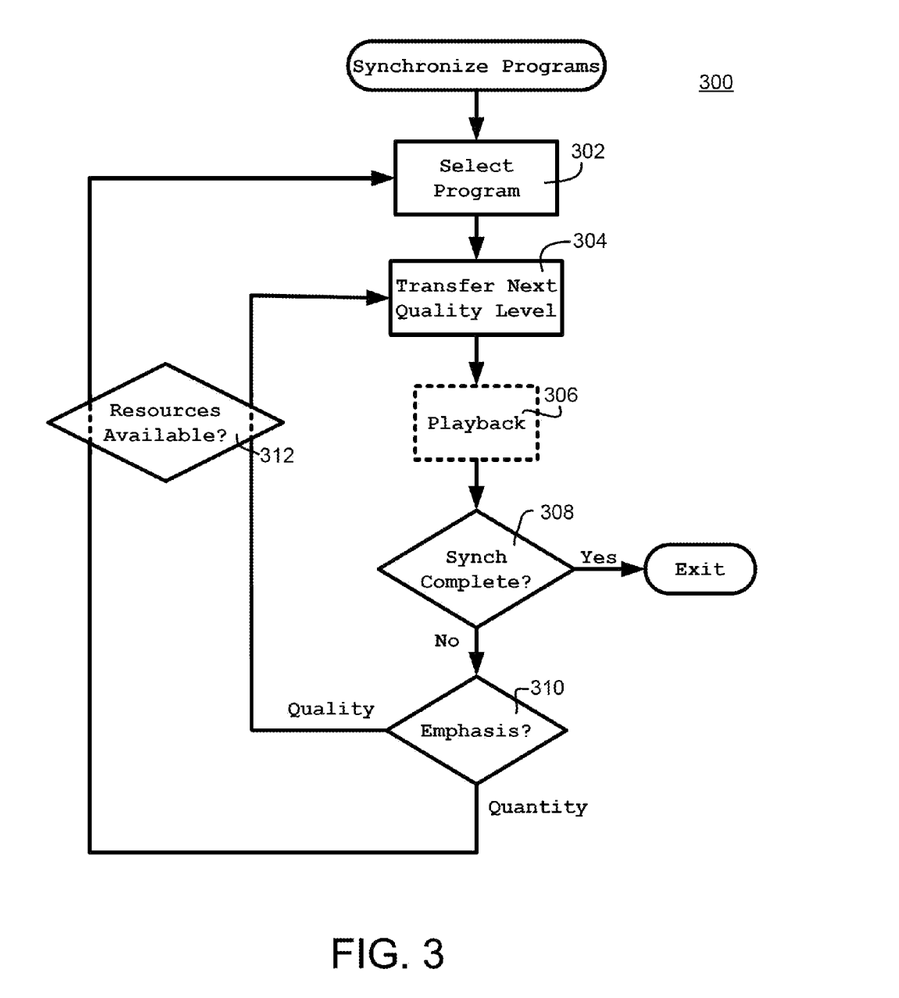
FIG. 3 is a flowchart of a first exemplary process to synchronize video programming.

With reference now to FIG. 3, an exemplary process 300 to schedule the synchronization of various layers 142A-K of programs 102 suitably includes the general functions of selecting a program 102 (function 302) and transferring a quality level 142 (function 304), then obtaining the next program 102 or level 142 of the same program based upon the user's desired emphasis on either quality or quantity of programming (function 310). In the event that resources become unavailable (function 312) and the synchronization process 150 is unable to completely transfer the entire schedule 140, then it is more likely that the viewer's most preferred content (in terms of quantity or quality) will be delivered. Note that the quantity vs. the quality of layers 142 that are transferred may vary from program to program. That is, a particular program 102 may be of relatively low priority in comparison to other programs, but the quality of the transferred data may be set to be relatively high. This could result in a schedule 140 that transfers lower layers of other programs first, but then transfers several layers of the particular program as time and resources allow. Conversely, higher priority programs 102 could have lower quality settings and vice versa. Using process 400, scheduling module 114 is able to allocate the various layers 142 of the different programs 102 into a schedule 140 that meets, or at least approximates, the user's preferences.

Playback (function 306) may occur in any manner. In various embodiments, playback is controlled by a media player or other playback module 127 of playback device 120. Playback device 120 also decodes or otherwise processes the received programs 102 as needed to render the programs 102 for playback. In various embodiments, playback 306 is initiated on the playback device 120 during the synchronization process 150. Still further, playback 306 may be initiated by providing a relatively low resolution layer 142 (e.g., base layer 103) to the playback device 120 at the outset of synchronization session 150 so that a playable version of the program 102 is available as soon as possible. As additional layers 104-106 are provided, then the increased resolution provided by these layers can be provided as desired.

Figure 4:
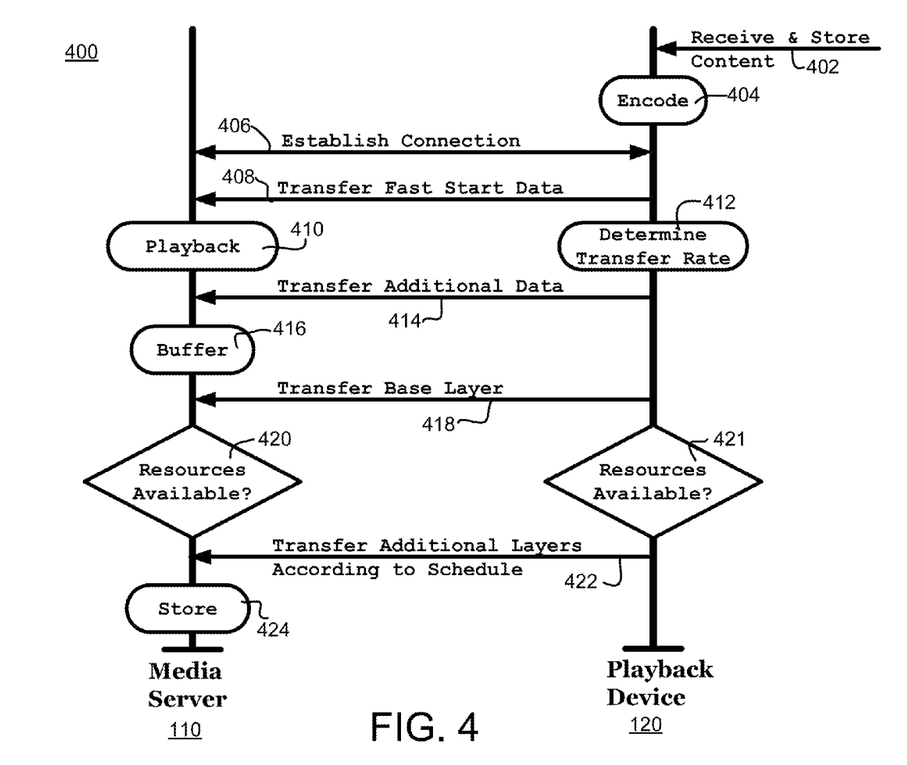
FIG. 4 is a process flow diagram showing an exemplary process to synchronize video programming between a media encoder and a playback device.

FIG. 4 provides additional detail about an exemplary process 400 to deliver media programs 102 from a media server 110 to a playback device 120. With reference now to FIG. 4, programs 102 may be initially received and stored at media server 110 in any manner (function 402). In the example shown in FIG. 1, broadcast programs 102 are received via a DBS, cable or other television source 133. Programs 102 may be equivalently received via network 130, via stored media (e.g., DVD or other disks), or from any other source. Programs 102 may be initially stored in a DVR or other storage 115 as described above.

Programs 102 may be encoded (function 404) into the multi-layer format prior to storage, or just prior to transmission over network 130 as desired. As noted above, encoding function 404 suitably involves encoding the received program 102 into a multi-layer format in which a base layer 103 contains sufficient data to support playback of the entire program 102 at a relatively low resolution and additional layers 104-106 provide additional detail that, when combined with the data from the base layer 103, supports playback at higher resolution. In various embodiments, the various layers 104-107 build upon each other such that each "higher" layer (e.g., layer 106) provides data that is added to data from the other layers (e.g., layers 103-105 in this example) to improve resolution or quality of the program 102 during playback.

The synchronization session 150 is established in any manner (function 406). In various embodiments, a media player or media manager application executing on playback device 120 suitably contacts server 110 when the playback device 120 is ready to receive synchronized programs 102. Server 110 and playback device 120 then establish a session (e.g., a TCP session or the like) that allows programs to be transferred from server 110 to playback device 120 via network 130. In some embodiments, the various layers 142 of the synchronized programs 102 are simply transferred in the user's preferred order set forth in schedule 140. The programs themselves may be transferred using TFTP or similar file transfer techniques, although other embodiments may use any type of network protocols and applications.

In some implementations, the playback device 120 initiates playback of the transferred program as soon as possible without waiting for the entire synchronization 150 to complete. To that end, server 110 may initially provide a relatively small portion of the transferred program 102 (e.g., a short clip on the order of a second or two to a minute or so) encoded at the base level 103 or a similarly low quality that can be quickly transferred using the available bandwidth of network 130. This allows the playback device 120 to begin playback (function 410) as soon as the relatively "thin" file is received. Various embodiments may further determine an estimated time to transfer the schedule 140 of layers (function 412), and to provide fast start or other data accordingly. This estimated time can be used to determine the proper amount of additional fast start data (function 414) that would be needed to support playback of the program 102 throughout the remaining transfer. The media server 110 therefore provides sufficient additional data 414 that can be buffered (function 416) to support playback of program 102 throughout the synchronization session 150. Other embodiments could equivalently eliminate fast start functionality entirely, or could eliminate functions 412 and 414 by simply providing a fixed amount of fast start data 408 at the outset to support reasonable and expected synchronization sessions 150. Still other embodiments may simply initiate playback 410 based upon the initially-transferred base layer 103, as desired.

After fast start data has been received and appropriately buffered, the base layers 103 of one or more programs 102 may be transferred (function 418) from server 110 to playback device 120. As noted above, functions 408-412 may be incorporated into the initial transfer 418 of base layer 103, as desired. As noted above, the initial transfer of the base layer 103 suitably increases the likelihood of playback device 120 receiving a usable copy of the program 102 by providing a complete copy of the program 102 at the outset, and then supplementing the complete base layer copy with additional quality/resolution data in layers 104-106 if transfer capability, destination device storage and/or other needed resources remain.

If sufficient resources remain available (functions 420, 421), then additional layers 142 may be transferred for one or more programs 102, as described above. The determination as to whether resources are available may be made at the playback device 120 (function 420) and/or at the server 110 (function 421). In various embodiments, playback device 120 may report transit times, remaining storage amounts and/or other data back to server 110 to indicate that resources remain available. In other embodiments, server 110 may determine resource availability based upon the status of the synchronization session 150 (e.g., whether a TCP session remains active), based upon transmit buffer utilization in server 110, and/or based upon any other factors as appropriate.

Received programs 102 are appropriately stored on playback device 120 (function 424) for subsequent playback. As noted above, storage of the various layers 142 allows playback device 120 to render the program 102 for playback to the user even if an active connection to network 130 is no longer available. Further since the highest priority layers 142 of the various programs are transferred at the outset of the synchronization session 150, the playback device 120 is likely to have enough data to render the user's most-desired content even if the connection is suddenly lost, if storage on the playback device 120 becomes filled, or if other conditions prohibit continued synchronization.

Generally speaking, the various functions and features of processes 300 and 400 may be automatically executed by any sort of hardware, software and/or firmware logic that is stored and/or executed on any platform. Some or all of process functions may be carried out, for example, by programmed logic executing within media server 110 and/or playback device 120 in FIG. 1, consistent with the descriptions provided herein. In one embodiment, processor 111 executes software logic (such as scheduler module 114 and/or delivery module 119) that performs each of the various functions associated with server 110. Such logic may be stored in memory 112 or in any other non-transitory storage available to processor 111 as desired. Media player device 120 may similarly have a processor 121 to execute software instructions that carry out the various functions shown to be associated with device 120, including receive module 125, decode module 126 and playback module 127. Such instructions may be stored in a memory or other non-transitory storage medium 122 available to the media player 120 as desired. The particular logic and hardware that implements any of the various functions shown in FIGS. 3-4 may vary from context to context, implementation to implementation, and embodiment to embodiment in accordance with the various features, scenarios and structures set forth herein. The particular means used to implement each of the various functions shown in FIGS. 3-4, then, could be any sort of hardware processing structures that are capable of executing conventional software logic in any format. Such processing hardware may include processor 111 or other components of server 110, as well as any other processors or other components associated with playback devices 120 as appropriate.

Various embodiments therefore provide scheduled and prioritized synchronization on a layer-by-layer basis instead of (or in addition to) on a program-by-program basis. By prioritizing layers rather than entire programs, the likelihood that a watchable program 102 will be transferred is improved. Additionally, some embodiments may use the lower-resolution base layers to quickly render playback of the lower-resolution programming, thereby reducing the latency of program startup and improving the user experience. Other embodiments may provide additional or alternate features, as desired.

The general systems, structures and techniques described above may be inter-combined, enhanced, modified and/or otherwise implemented to provide any number of different features. To that end, the term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A media server device to deliver a plurality of media programs to a remotely-located playback device via a network, the media server device comprising:
    an interface to the network;
    a data storage device configured to store the plurality of media programs;
    processing circuitry configured to encode each of the media programs into a multi-layer format having a plurality of layers that comprises a base layer and at least one additional layer, wherein the base layer supports playback of the entire media program at a lower resolution and wherein each of the at least one additional layers provides additional data that, when combined with the base layer, supports playback of the media program at a higher resolution than the lower resolution supported by the base layer; and
    a processor configured to execute a software program comprising a media delivery module configured to automatically deliver the plurality of media programs to the remotely-located playback device using the interface, wherein the base layers of all of the media program are first provided to the remotely-located playback device and, if the network remains available after delivery of all of the base layers for all of the media programs is complete, then the at least one additional layers are subsequently provided to the remotely-located playback device while the network remains available to thereby enable the remotely-located playback device to play back any of the plurality of media programs in its entirety at the lower resolution using the received base layer of the media program even if the network is no longer available to deliver the at least one additional layers of one or more of the media programs.

2. The media server device of claim 1 further comprising a receiver that receives the media programs as television broadcasts.

3. The media server device of claim 2 wherein the media programs are initially received as the television broadcasts and stored on the data storage, and wherein the encoder module subsequently encodes the media programs into the multi-layer format prior to delivery to the remotely-located playback device.

4. The media server device of claim 3 wherein the media programs are provided from the media server device to the remotely-located playback device during a common synchronization session.

5. The media server device of claim 4 wherein the common synchronization session proceeds according to a schedule that prioritizes at least some of the plurality of layers for each of the plurality of media programs based upon user-defined preferences.

6. The media server device of claim 5 wherein the user-defined preferences provide for first synchronizing all of the base layers for the plurality of programs, then synchronizing all of the additional layers for at least one program, and then synchronizing the additional layers for the other programs as long as the network remains available.

7. A method to transfer a plurality of media programs from a media server to a playback device over a network, wherein each of the media programs is encoded in a multi-layer format having a plurality of layers comprising a base layer and at least one additional layer, wherein the base layer supports playback of the entire media program at a lower resolution and wherein each of the at least one additional layers provides additional data that, when combined with the base layer, supports playback of the media program at a higher resolution than the lower resolution supported by the base layer, wherein the method comprises:

initially transferring the base layers of all of the media programs from the media server via a data connection to the playback device to thereby allow playback of all of the media programs at the lower resolution on the playback device;

after all of the base layers of all of the media programs have been transferred to the playback device, determining if the network remains available to support transfer of the additional layers of the media programs to the playback device; and     if the network remains available after transfer of all of the base layers, then, without further input from the viewer, subsequently transferring at least one of the additional layers of at least one of the media programs to the playback device via the data connection to thereby allow playback of the at least one of the media programs at the higher resolution on the playback device, and if the network is not available, not transferring the at least one of the additional layers of the at least one of the media programs to the playback device but permitting playback of the media programs at the lower resolution from the transferred base layers even though the additional layers were not transferred.

8. The method of claim 7 further comprising the playback device determining if storage space remains available to support storage of the at least one of the additional layers on the playback device.

9. The method of claim 7 wherein subsequent transferring is performed during a common synchronization session in accordance with a schedule that considers priorities in synchronizing the various layers of the different media programs.

10. The method of claim 9 wherein the schedule prioritizes the common synchronization session upon user-defined preferences.

11. The method of claim 10 wherein the user-defined preferences provide for first synchronizing all of the base layers for the plurality of different media programs, then synchronizing all of the additional layers for at least one media program, and then synchronizing the additional layers for the other media programs.

* * * * *